(12) United States Patent
Kim et al.

(10) Patent No.: US 11,305,608 B2
(45) Date of Patent: Apr. 19, 2022

(54) AIR CONDITIONER FOR VEHICLE

(71) Applicant: Hanon Systems, Daedeok-gu Daejeon (KR)

(72) Inventors: Yong Ho Kim, Daedeok-gu Daejeon (KR); Chui Hee Kim, Daedeok-gu Daejeon (KR); Hak Kyu Kim, Daedeok-gu Daejeon (KR); Byeong Ha Lee, Daedeok-gu Daejeon (KR); Yong Seon Lee, Daedeok-gu Daejeon (KR); Jun Min Lee, Daedeok-gu Daejeon (KR); Jae O Jung, Daedeok-gu Daejeon (KR); Jae Won Jeong, Daedeok-gu Daejeon (KR)

(73) Assignee: HANON SYSTEMS, Daejeon (KR)

( * ) Notice: Subject to any disclaimer, the term of this patent is extended or adjusted under 35 U.S.C. 154(b) by 271 days.

(21) Appl. No.: 16/774,559

(22) Filed: Jan. 28, 2020

(65) Prior Publication Data

US 2020/0238789 A1 Jul. 30, 2020

(30) Foreign Application Priority Data

Jan. 29, 2019 (KR) .................. 10-2019-0011368
Oct. 16, 2019 (KR) .................. 10-2019-0128127

(51) Int. Cl.
  B60H 1/00 (2006.01)
  B60H 1/24 (2006.01)
(52) U.S. Cl.
  CPC ..... B60H 1/00285 (2013.01); B60H 1/00007 (2013.01); B60H 1/00035 (2013.01);
  (Continued)

(58) Field of Classification Search
  CPC ............ B60H 1/00285; B60H 1/00007; B60H 1/00035; B60H 1/00295; B60H 1/242;
  (Continued)

(56) References Cited

U.S. PATENT DOCUMENTS 3,127,931 A * 4/1964 Johnson ............. B60H 1/00285
  165/43
3,394,887 A * 7/1968 Megargle ................ B60S 1/586
  237/12.3 A (Continued)

FOREIGN PATENT DOCUMENTS

DE      19649512 A1   6/1998
DE   102015110481 A1   1/2017
  (Continued)

*Primary Examiner* — Emmanuel E Duke
(74) *Attorney, Agent, or Firm* — Dickinson Wright PLLC

(57) ABSTRACT

The present invention relates to an air conditioner for a vehicle having a rear seat outlet, which can relieve temperature inversion that discharge temperature of the console vent becomes higher than discharge temperature of a rear seat floor vent in a bi-level mode, and prevent reduction of air volume of the console vent in the cooling mode. The air conditioner for a vehicle, which has a rear seat outlet, includes an air-conditioning case having an air passageway formed therein and a plurality of air outlets, and a cooling heat exchanger and a heating heat exchanger disposed in the air passageway of the air-conditioning case to exchange heat with air passing through the air passageway. Wherein the air outlets include a console vent and a rear seat floor vent, and an entrance of the rear seat floor vent is formed above an entrance of the console vent.

18 Claims, 19 Drawing Sheets

(52) U.S. Cl.
CPC ......... *B60H 1/00295* (2019.05); *B60H 1/242* (2013.01); *B60H 1/246* (2013.01); *B60H 2001/00185* (2013.01)

(58) Field of Classification Search
CPC ............... B60H 1/246; B60H 1/00678; B60H 1/00064; B60H 2001/00185; B60H 2001/00092; B60H 2001/00721
See application file for complete search history.

(56) References Cited

U.S. PATENT DOCUMENTS

| | | | | |
|---|---|---|---|---|
| 3,550,522 A * | 12/1970 | Bauer | ................ | B60H 1/00564 454/144 |
| 3,814,314 A * | 6/1974 | Morden | ............. | B60H 1/00471 237/12.3 B |
| 3,919,926 A * | 11/1975 | Yamada | ................... | B60N 2/06 454/144 |
| 4,343,230 A * | 8/1982 | Lundstrom | ............ | B60H 1/246 454/144 |
| 4,840,115 A * | 6/1989 | Johnson | ................. | B60H 1/247 454/120 |
| 6,415,851 B1 * | 7/2002 | Hall | ................... | B60H 1/00064 165/42 |
| 6,857,955 B1 * | 2/2005 | Held | ...................... | B60H 1/246 454/143 |
| 6,871,696 B2 * | 3/2005 | Aoki | .................. | B60H 1/00285 165/203 |
| 8,608,532 B2 * | 12/2013 | Kumar | ................... | B60H 1/242 454/141 |
| 9,533,543 B2 * | 1/2017 | Maehata | ............ | B60H 1/00028 |
| 2003/0176159 A1 * | 9/2003 | Nakagawa | ......... | B60H 1/00564 454/144 |
| 2005/0118944 A1 * | 6/2005 | Vincent | .............. | B60H 1/00671 454/121 |
| 2008/0032618 A1 * | 2/2008 | Katoh | ................ | B60H 1/00564 454/143 |

FOREIGN PATENT DOCUMENTS

| | | |
|---|---|---|
| EP | 0845375 A2 | 6/1998 |
| JP | 2008189181 A | 8/2008 |
| KR | 101484718 B1 | 1/2015 |
| KR | 1020150022097 A | 3/2015 |

* cited by examiner

PRIOR ART

PRIOR ART

PRIOR ART

AIR CONDITIONER FOR VEHICLE

CROSS-REFERENCES TO RELATED APPLICATIONS

This patent application claims priority to Korean Patent Application No. 10-2019-0011368 filed Jan. 29, 2019, and Korean Patent Application No. 10-2019-0128127 filed Oct. 16, 2019. The entire disclosures of the above applications are incorporated herein by reference.

BACKGROUND OF THE INVENTION

Field of the Invention

The present invention relates to an air conditioner for a vehicle, and more particularly, to an air conditioner for a vehicle, which includes a rear seat outlet formed to individually control front seat air-conditioning and rear seat air-conditioning of the vehicle.

Background Art

In general, an air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the indoor air or the outdoor air into the air conditioner, heating or cooling the introduced air, and blowing the heated or cooled air into the vehicle.

Korean Patent No. 1484718 (granted on Jan. 14, 2015) discloses an air conditioner for a vehicle which controls positions of a rear seat temperature door, an auxiliary rear seat temperature door, and a rear seat on-off door in order to adjust air volume of the rear seat. FIG. 1 is a sectional view of a conventional air conditioner for a vehicle. As shown in FIG. 1, the air conditioner for a vehicle includes an air-conditioning case 10, an evaporator 20, a heater core 30, a front seat temperature door 51, and a front seat mode door.

The air-conditioning case 10 includes an air inlet 11 and air outlets, and an air passageway formed therein. A blower unit is connected to the air inlet 11 so that indoor air or outdoor air is selectively introduced into the air passageway formed inside the air-conditioning case 10. The air outlets include a defrost vent 12, a front seat face vent 13, a front seat floor vent 14, a rear seat face vent 15, and a rear floor vent 16. The air passageway inside the air-conditioning case 10 includes a front seat cold air passageway P1, a warm air passageway P2, and a rear seat cold air passageway P3.

The evaporator 20 is a heat exchanger for cooling and cools air passing through the evaporator 20. The heater core 30 is a heat exchanger for heating and heats air passing through the heater core 30. The heater core 30 is arranged in the warm air passageway P2 which is located downstream of the evaporator 20 in an air flow direction. An electric heater 40, such as a PTC heater, may be further disposed in the warm air passageway P2. The front seat temperature door 51 is arranged between the evaporator 20 and the heater core 30 in order to adjust the degree of opening of the warm air passageway P2 passing the heater core 30 and the degree of opening of the cold air passageways P1 and P3 bypassing the heater core 30. The front seat mode door includes a defrost door 53, a vent door 54, and a floor door 55.

The rear seat air passageway includes the rear seat cold air passageway P3 that the air passing through the evaporator 20 bypasses the heater core 30 and a warm air passageway passing through the heater core 30. The warm air passageway of the rear seat air passageway is used together with the warm air passageway P2 of the front seat air passageway. That is, some of air passing through the heater core 30 and flowing in the warm air passageway P2 moves upwardly, and then, is discharged to at least one among the defrost vent 12, the front seat face vent 13, and the front seat floor vent 14, and the other of the air moves downwardly, and then, is discharged to at least one among the console vent 15 and a rear seat floor vent 16. A rear seat mode door 58 is disposed in the rear seat air passageway to adjust the degree of opening of the console vent 15 and the degree of opening of the rear seat floor vent 16.

The air-conditioning case 10 has a rear seat temperature door 52, an auxiliary rear seat temperature door 56, and a rear seat on-off door 57 which are disposed in the air-conditioning case 10. The rear seat temperature door 52 is disposed between the evaporator 20 and the heater core 30 in order to adjust the degree of opening of a passageway flowing to the warm air passageway P2 and a passageway flowing to the rear seat cold air passageway P3. The auxiliary rear seat temperature door 56 is arranged downstream of the heater core 30 in the air flow direction in order to adjust the degree of opening of a passageway flowing to the rear seat air outlets. The rear seat on-off door 57 adjusts the degree of opening of the rear seat cold air passageway P3.

FIG. 2 is a view of a front and rear seat cooling mode of the conventional air conditioner for a vehicle. Referring to FIG. 2, in the front and rear seat cooling mode, the front seat temperature door 51 closes the warm air passageway P2 and opens the front seat cold air passageway P1, and the rear seat temperature door 52 closes the warm air passageway P2 and opens the rear seat cold air passageway P3. The auxiliary rear seat temperature door 56 closes the passageway in which the air flows toward the rear seat air outlets, and the rear seat on-off door 57 opens the rear seat cold air passageway P3. The air cooled while passing the evaporator 20 bypasses the heater core 30, so that some of the air is discharged to at least one among the front seat air outlets after passing through the front seat cold air passageway P1 and the other of the air is discharged to at least one among the rear seat air outlets after passing through the rear seat cold air passageway P3.

FIG. 3 is a view of a front and rear seat heating mode of the conventional air conditioner for a vehicle. Referring to FIG. 3, in the front and rear seat heating mode, the front seat temperature door 51 closes the front seat cold air passageway P1 and opens the warm air passageway P2, and the rear seat temperature door 52 closes rear seat cold air passageway P3 and opens the warm air passageway P2. The auxiliary rear seat temperature door 56 opens the passageway in which the air flows toward the rear seat air outlets, and the rear seat on-off door 57 closes the rear seat cold air passageway P3. The air cooled while passing the evaporator 20 is heated while passing through the heater core 30, so that some of the air is discharged to at least one among the front seat air outlets after moving upwards and the other of the air is discharged to at least one among the rear seat air outlets after moving downwards.

The structure of the rear seat outlets of the conventional air conditioner for a vehicle has the warm air passageway formed at an upper part and the cold air passageway located at a lower part. Moreover, a console vent is located at the upper part and the rear seat floor vent are located at the lower part.

Therefore, because the warm air passageway and a discharge path of the console vent are located to be close to each other and the cold air passageway and a discharge path of the rear seat floor vent are located to be close to each other, in a bi-level mode, there occurs a vertical temperature inversion that discharge temperature of the console vent becomes higher than discharge temperature of the rear seat floor vent. Furthermore, because the console vent discharge path gets away from the cold air passageway, in the cooling mode, the air volume is reduced due to a high ventilation resistance in the air passageway of the console vent side.

SUMMARY OF THE INVENTION

Accordingly, the present invention has been made to solve the above-mentioned problems occurring in the prior arts, and it is an object of the present invention to provide an air conditioner for a vehicle including a rear seat outlet which can relieve temperature inversion that discharge temperature of the console vent becomes higher than discharge temperature of a rear seat floor vent in a bi-level mode, and prevent reduction of air volume of the console vent in the cooling mode.

It is another object of the present invention to provide an air conditioner for a vehicle, which can send cold air above the rear seat part of the vehicle and warm air below the rear seat part so that cold air is blown toward a passenger's face and warm air is blown toward the passenger's legs, thereby enhancing comfort properties.

To accomplish the above object, according to the present invention, there is provided an air conditioner for a vehicle which has a rear seat outlet, the air conditioner including: an air-conditioning case having an air passageway formed therein and a plurality of air outlets; and a cooling heat exchanger and a heating heat exchanger disposed in the air passageway of the air-conditioning case to exchange heat with air passing through the air passageway, wherein the air outlets include a console vent and a rear seat floor vent, and an entrance of the rear seat floor vent is formed above an entrance of the console vent.

Moreover, a discharge path of the console vent is formed below a warm air passageway to be connected with a cold air passageway, and a discharge path of the rear seat floor vent is formed above the cold air passageway to be connected with the warm air passageway.

Furthermore, the rear seat floor vents are formed at both sides of the air-conditioning case in the width direction, and the console vent is formed between a pair of the rear floor vents in the width direction.

Additionally, warm air of the warm air passageway moves downwards through the lateral surface of the rear seat floor vent path, and then, is discharged through a rear seat floor vent outlet.

In addition, the air conditioner for a vehicle further includes a rear seat mode door for adjusting the degree of opening of the console vent and the degree of opening of the rear seat floor vent, wherein the rear seat mode door is formed in a dome shape of which both sides are closed in a width direction.

Moreover, both sides of the rear seat mode door in the width direction block the entrance of the rear seat floor vent to shut off the air discharged to the rear seat floor vent, and the dome-shaped surface blocks the entrance of the console vent to shut off the air discharged to the console vent.

Furthermore, the air passageway of the air-conditioning case comprises: a warm air passageway formed to make the air passing the cooling heat exchanger pass the heating heat exchanger; a front seat cold air passageway formed to make the air passing the cooling heat exchanger bypass the heating heat exchanger so as to be discharged to the front seat of the vehicle; and a rear seat cold air passageway formed to make the air passing the cooling heat exchanger bypass the heating heat exchanger so as to be discharged to the rear seat of the vehicle, and the front seat cold air passageway, the warm air passageway, and the rear seat cold air passageway have rear seat outlets, which are formed vertically in order.

Additionally, the air conditioner for a vehicle further includes a rear seat outlet including a front seat temperature door for adjusting the degree of opening between the front seat cold air passageway and a part of the warm air passageway, a first rear seat temperature door arranged between the cooling heat exchanger and the heating heat exchanger to adjust the degree of opening of another part of the warm air passageway, and a second rear seat temperature door arranged at the downstream side of the heating heat exchanger to adjust the degree of opening between the warm air passageway and the rear seat cold air passageway.

In addition, the rear seat outlet further includes a hot channel part for guiding the air passing the heating heat exchanger to the console vent at the downstream side of the heating heat exchanger.

Moreover, the hot channel part connects the warm air passageway with the entrance of the console vent.

Furthermore, the hot channel part is formed in a tube shape of which both sides are opened, and one side is opened toward the warm air passageway and the other side is opened toward the console vent.

Additionally, the opening part of the other side of the hot channel part is formed below the entrance of the rear seat floor vent.

In addition, the air conditioner for a vehicle further includes a rear seat mode door for adjusting the degree of opening of the console vent and the degree of opening of the rear seat floor vent, wherein the rear seat mode door is formed in a dome shape of which both sides are closed in the width direction, and the opening part of the other side of the hot channel part faces the dome-shaped inner surface of the rear seat mode door.

Moreover, the rear seat floor vents are formed at both sides of the air-conditioning case in the width direction, and the hot channel part is formed between a pair of the rear seat floor vents in the width direction.

In another aspect of the present invention, there is an air conditioner for a vehicle including: a rear seat cold air passageway for transferring cold air passing through a cooling heat exchanger; a warm air passageway for transferring warm air passing through a heating heat exchanger; and a console vent and a rear seat floor vent for discharging the cold air of the rear seat cold air passageway and the warm air of the warm air passageway to the rear seat of the interior of the vehicle, wherein the console vent is formed to correspond to the rear seat cold air passageway near the cooling heat exchanger, and the rear seat floor vent is formed to correspond to the warm air passageway near the heating heat exchanger.

Moreover, the rear seat cold air passageway is formed at a lower part of the air-conditioning case and below the heating heat exchanger and the warm air passageway is formed above the rear seat cold air passageway, and the console vent and the rear seat floor vent are respectively formed at the lower part and the upper part of the air-conditioning case to correspond to the rear seat cold air passageway of the lower side and the warm air passageway of the upper side.

Furthermore, the air conditioner for a vehicle further includes: a console duct for transferring the cold air discharged from the console vent in the upward direction from a passenger who is sitting on the rear seat; and a rear seat floor duct for transferring the warm air discharged from the rear seat floor vent in the downward direction from the passenger who is sitting on the rear seat.

Additionally, the console duct is bent and extended in the upward direction of the rear seat from the console vent of the lower side to transfer the cold air discharged from the console vent of the lower side toward the face of the passenger who is sitting on the rear seat, and the rear seat floor duct is bent and extended in the downward direction of the rear seat from the rear seat floor vent of the upper side to transfer the warm air discharged from the rear seat floor vent of the upper side toward the legs of the passenger who is sitting on the rear seat.

Moreover, a pair of the console vents are formed side by side in the width direction of the air-conditioning case to be spaced apart from each other, and the single rear seat floor vent is formed in the width direction of the air-conditioning case, and a pair of the console ducts are formed corresponding to the console ducts, and the single rear seat floor vent is formed corresponding to the rear seat floor vent.

Furthermore, the rear seat floor duct is bent and extended in the downward direction of the rear seat from the rear seat floor vent, between a pair of the console ducts.

The air conditioner for a vehicle according to the present invention can relieve temperature inversion that discharge temperature of the console vent becomes higher than discharge temperature of the rear seat floor vent in a bi-level mode, and prevent reduction of air volume of the console vent in the cooling mode, thereby enhancing cooling performance and heating performance.

Additionally, the air conditioner for a vehicle according to the present invention has an improved arrangement structure of the console vent and the rear seat floor vent in order to discharge cold air toward the console vent and warm air toward the rear seat floor vent. In addition, the air conditioner for a vehicle according to the present invention sends cold air above the rear seat part of the vehicle and warm air below the rear seat part so that cold air is blown toward a passenger's face and warm air is blown toward the passenger's legs, thereby enhancing comfort properties.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, with reference to the attached drawings, technical structure and configuration of an air conditioner for a vehicle according to a preferred embodiment of the present invention will be described in detail.

Figure 1:
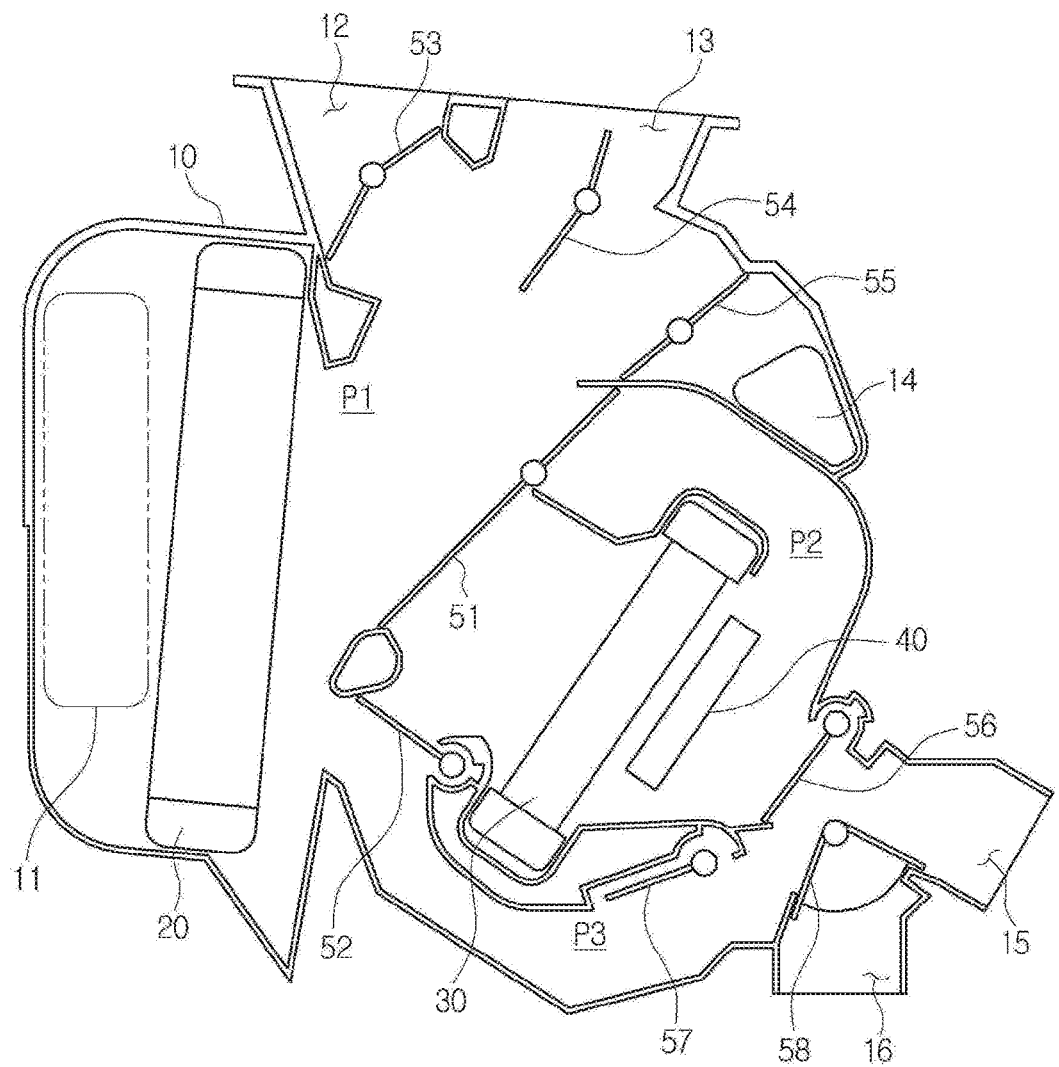
FIG. 1 is a sectional view of a conventional air conditioner for a vehicle.
Figure 2:
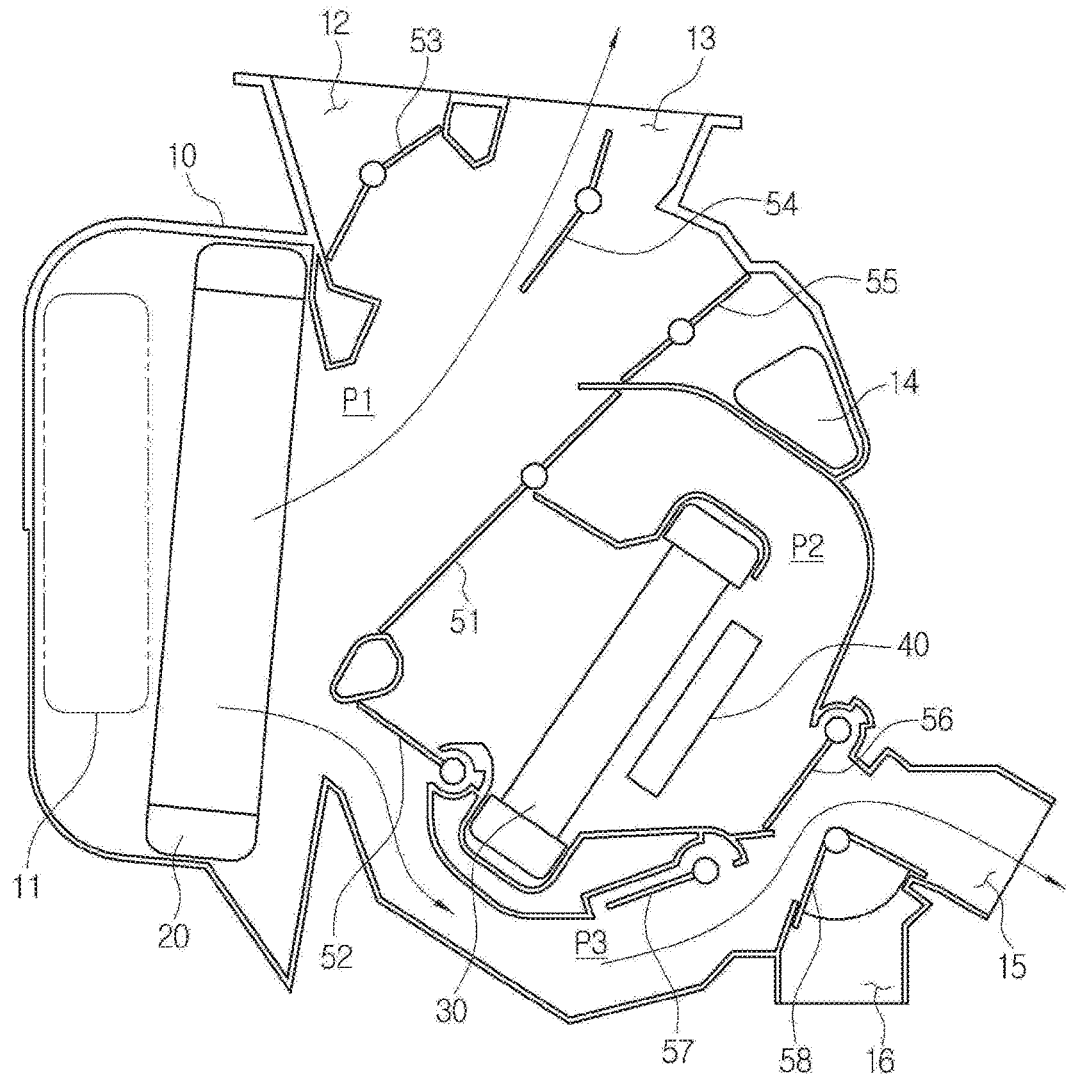
FIG. 2 is a view showing a front seat and rear seat cooling mode of the conventional air conditioner for a vehicle.
Figure 3:
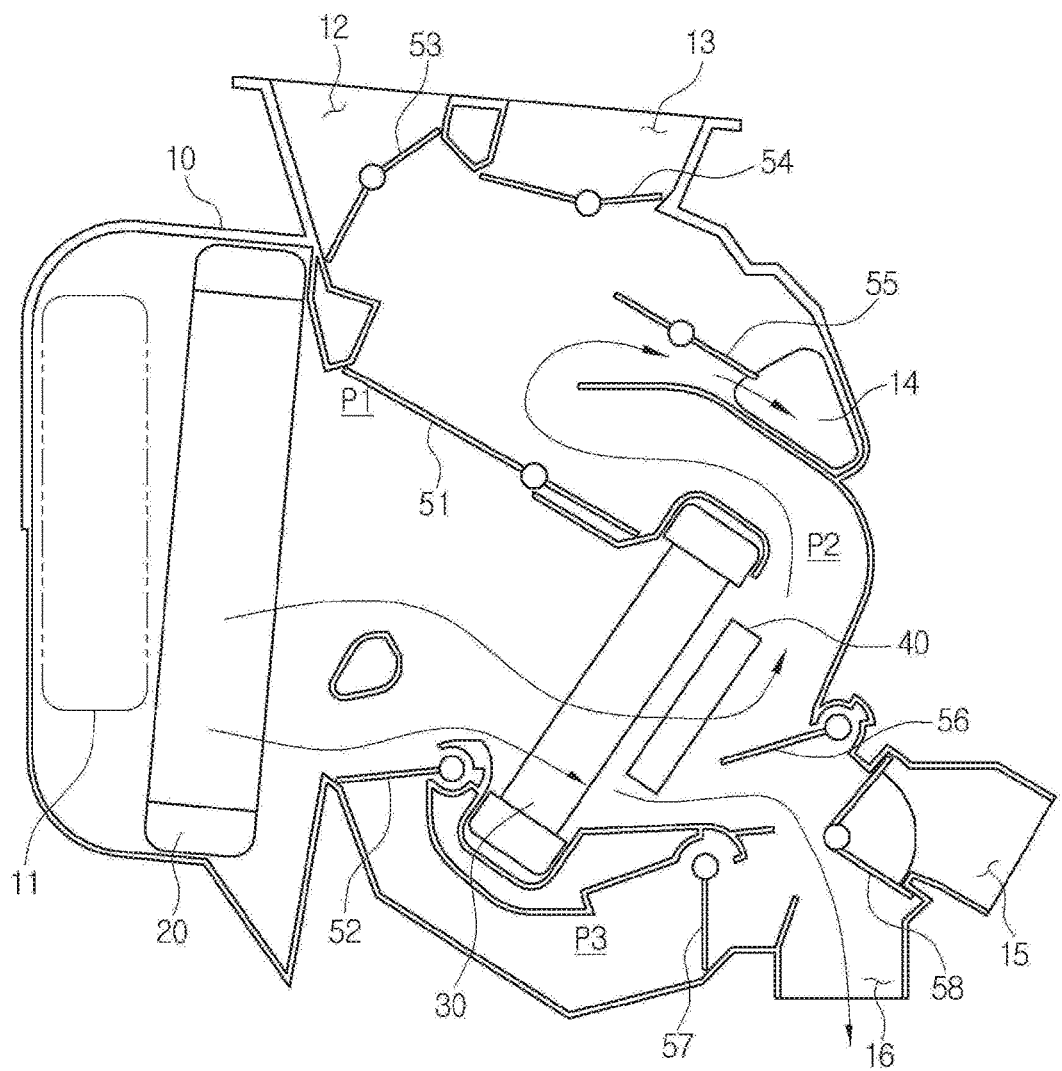
FIG. 3 is a view showing a front seat and rear seat cooling mode of the conventional air conditioner for a vehicle.
Figure 4:
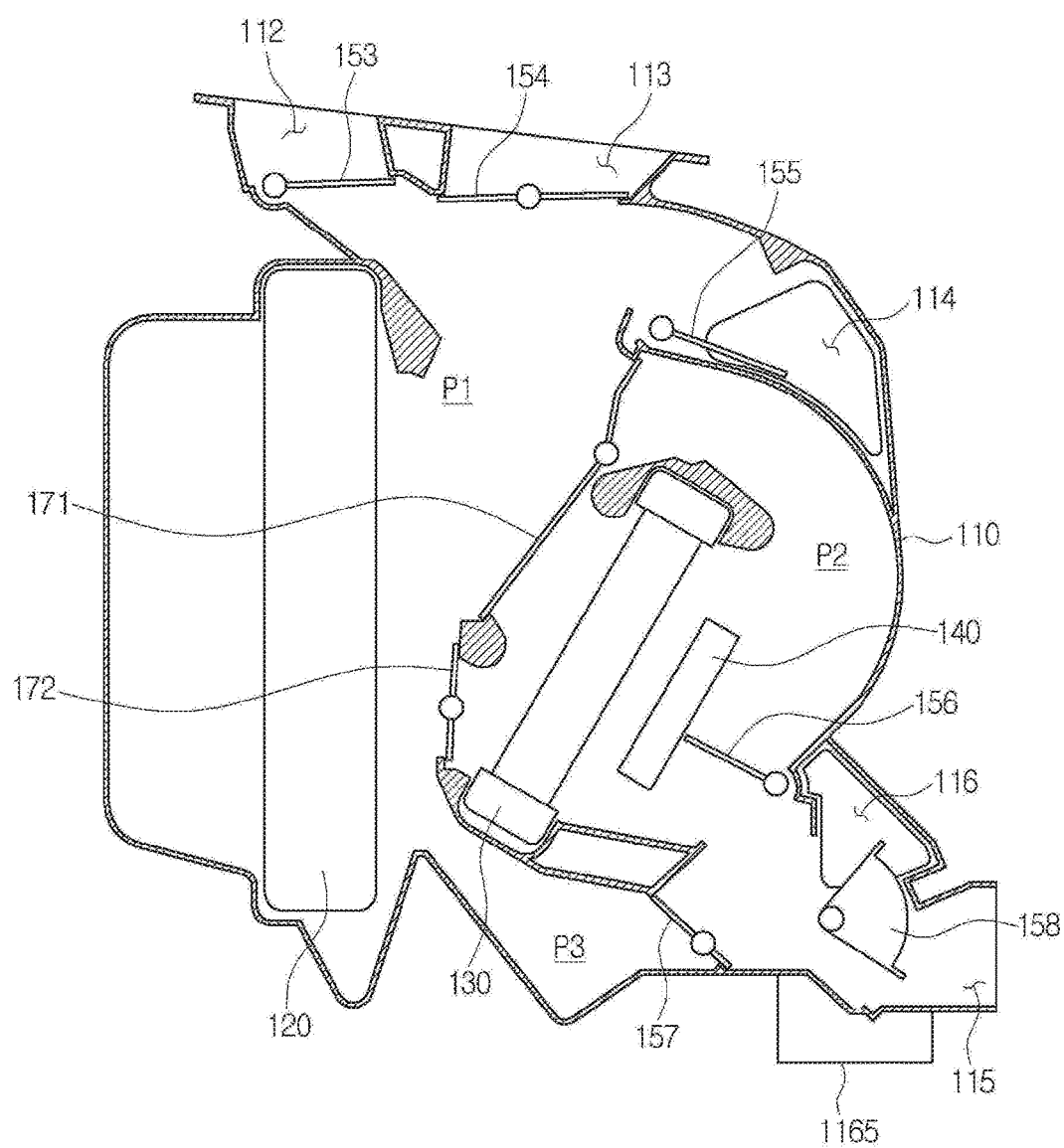
FIG. 4 is a sectional view showing an air conditioner for a vehicle according to a first embodiment of the present invention.
Figure 5:
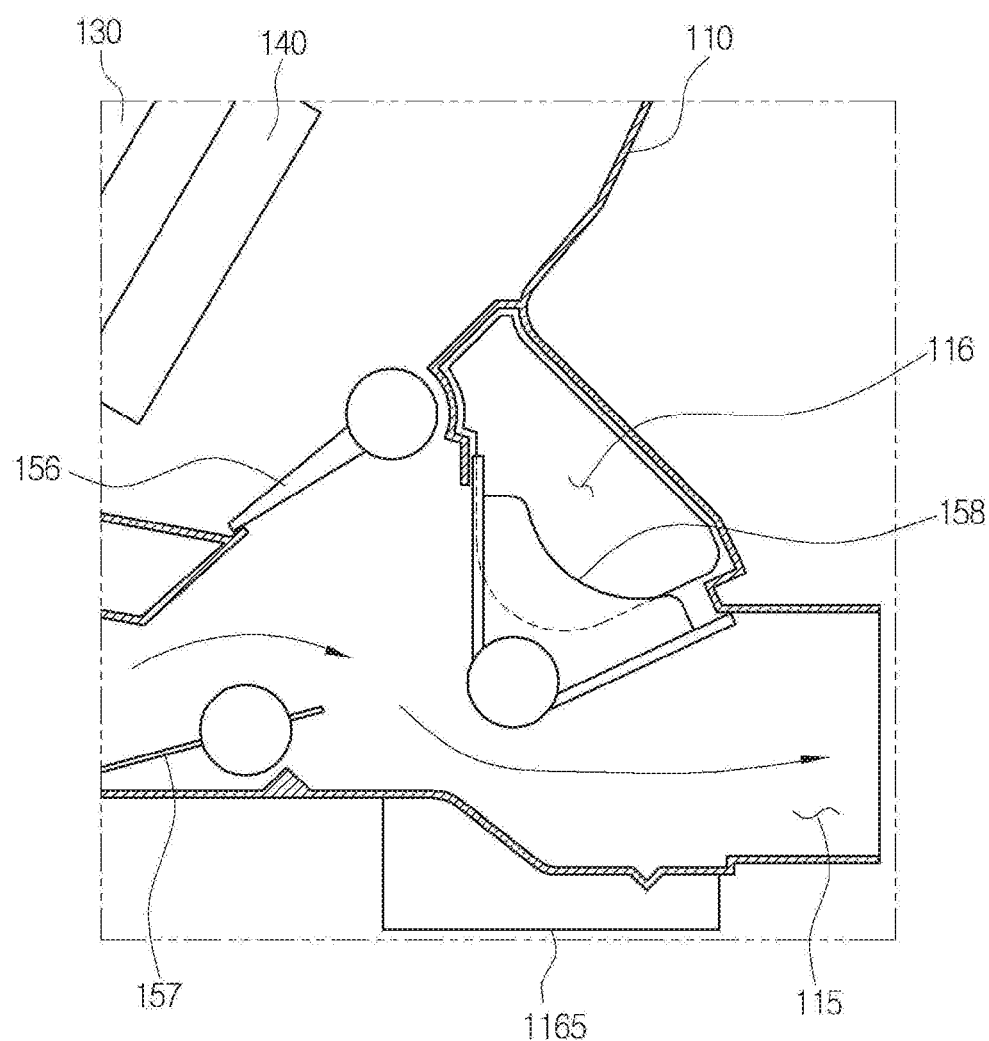
FIG. 5 is a view showing a location of a rear seat mode door in a vent mode according to the embodiment of the present invention.
Figure 6:
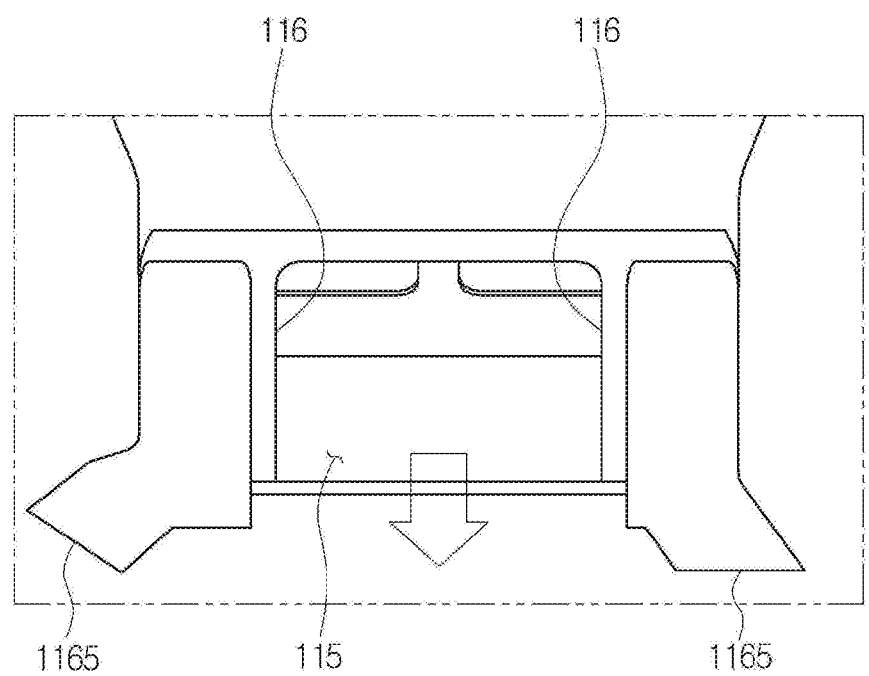
FIG. 6 is a front view of an air-conditioning case showing an air flow in the vent mode according to the embodiment of the present invention.

FIG. 4 is a sectional view showing an air conditioner for a vehicle according to a first embodiment of the present invention, FIG. 5 is a view showing a location of a rear seat mode door in a vent mode according to the embodiment of the present invention, and FIG. 6 is a front view of an air-conditioning case showing an air flow in the vent mode according to the embodiment of the present invention.

As shown in FIGS. 4 to 6, the air conditioner for a vehicle according to the preferred embodiment of the present invention includes: an air-conditioning case 110 having an air passageway formed therein; and a cooling heat exchanger and a heating heat exchanger, which are disposed in the air passageway of the air-conditioning case 110 to exchange heat with air passing through the air passageway.

The air-conditioning case 110 includes an air inlet 111, the plurality of air outlets, and the air passageway formed therein. A blower unit is connected to the air inlet 111 so that indoor air or outdoor air are selectively introduced into the air passageway of the air-conditioning case 110. The air outlets are a front seat air outlet having a defrost vent 112, a front seat face vent 113 and a front seat floor vent 114, and a rear seat air outlet having a console vent 115 and a rear seat floor vent 116.

The cooling heat exchanger is an evaporator 120. The evaporator 120 cools air by exchanging heat between refrigerant flowing in the evaporator 120 and air passing through the evaporator 120. The heat exchanger for heating is a heater core 130. The heater core 130 heats air by exchanging heat between cooling water flowing in the heater core 130 and air passing through the heater core 130. The heater core 130 is arranged in a warm air passageway P2, which is located downstream of the evaporator 120 in an air flow direction. An electric heater 140, such as a PTC heater, may be further disposed in the warm air passageway P2.

The air passageway of the air-conditioning case 110 includes a front seat cold air passageway P1, the warm air passageway P2, and a rear seat cold air passageway P3. The air passageway located downstream of the evaporator 120 is divided into three, namely, the front seat cold air passageway P1, the warm air passageway P2, and the rear seat cold air passageway P3.

The front seat cold air passageway P1, the warm air passageway P2, and the rear seat cold air passageway P3 are formed in order from the top to the bottom, and the warm air passageway P2 is vertically arranged between the front seat cold air passageway P1 and the rear seat cold air passageway P3.

The warm air passageway P2 is formed in such a way that the air passing through the evaporator 120 flows toward the front seat or the rear seat of the vehicle after passing through the heater core 130 and the electric heater 140. The front seat cold air passageway P1 is formed in such a way that the air passing through the evaporator 120 bypasses the heater core 130 and the electric heater 140 and is discharged toward the front seat of the vehicle. The rear seat cold air passageway P3 is formed in such a way that the air passing through the evaporator 120 bypasses the heater core 130 flows toward the rear seat of the vehicle. The air passing through the evaporator 120 flows toward the front seat cold air passageway P1 and the rear seat cold air passageway P3 after bypassing the heater core 130 of the warm air passageway P2, or flows to the front seat cold air passageway P1 or the rear seat cold air passageway P3 after passing through the heater core 130 of the warm air passageway P2.

The air-conditioning case 110 has a front seat air outlet for discharging air toward the front seat of the vehicle, and the front seat air outlet is controlled in the degree of opening by a front seat mode door. The front seat mode door includes a defrost door 153 for adjusting the degree of opening of the defrost vent 112, a vent door 154 for adjusting the degree of opening of the front seat face vent 113, and a floor door 155 for adjusting the degree of opening of the floor vent 114. Moreover, the air-conditioning case 110 has a rear seat air outlet for discharging air toward the rear seat of the vehicle, and the rear seat air outlet is controlled in the degree of opening by a rear seat mode door 158.

The air conditioner for a vehicle according to the present invention includes a front seat temperature door 171. The front seat temperature door 171 adjusts the degree of opening between the front seat cold air passageway P1 and the warm air passageway P2. The front seat temperature door 171 is adjacent to the downstream side of the evaporator 120, and is located at a boundary part where the front seat cold air passageway P1 and the warm air passageway P2 diverge from each other. The front seat temperature door 171 is formed in a tail door type having plate members at both sides in a radial direction based on a rotary axis.

The air conditioner for a vehicle according to the embodiment of the present invention is configured to control temperature of three independent zones, namely, the front driver's seat, the front passenger's seat, and the rear seat, and can control temperature of the rear seat by three doors. In other words, the air conditioner for a vehicle includes a first rear seat temperature door 172, a second rear seat temperature door 156, and a rear seat mode door 158.

The first rear seat temperature door 172 is arranged between the evaporator 120 and the heater core 130 in order to adjust the degree of opening of another part of the warm air passageway P2. That is, the first rear seat temperature door 172 adjusts the degree of opening of a lower part of an entrance of the warm air passageway P2, which is not covered by the front seat temperature door 171.

The second rear seat temperature door 156 is arranged downstream of the heater core 130 in order to adjust the degree of opening between the warm air passageway P2 and the rear seat cold air passageway P3. The warm air passageway P2 and the rear seat cold air passageway P3 at the downstream side of the heater core 130 are communicated with each other. The second rear seat temperature door 156 is arranged in a communication passageway between the warm air passageway P2 and the rear seat cold air passageway P3 at the downstream side of the heater core 130. That is, the second rear seat temperature door 156 adjusts the degree of opening between the communication passageway, which is formed between the warm air passageway P2 and the rear seat cold air passageway P3, and the rear seat cold air passageway P3.

The rear seat mode door 158 is arranged at the downstream side of the second rear seat temperature door 156 to adjust the degree of opening of the rear seat air outlet. The rear seat mode door 158 is formed in a dome-shaped door type. The rear seat mode door 158 adjusts the degree of opening between the console vent 115 and the rear seat floor vent 116. Moreover, the rear seat cold air passageway P3 further includes a rear seat on-off door 157 for opening or closing the rear seat cold air passageway.

An entrance of the rear seat floor vent 116 is formed above an entrance of the console vent 115. That is, a discharge path of the console vent 115 is formed below the warm air passageway P2 to be connected with the rear seat cold air passageway P3, and a discharge path of the rear seat floor vent 116 is formed above the cold air passageway P3 to be connected with the warm air passageway P2. Through the structure, the air conditioner can control temperature such that discharge temperature of the console vent 115 becomes lower than discharge temperature of the rear seat floor vent 116 to effectively prevent a vertical temperature difference, thereby optimizing temperature control.

In detail, the rear seat floor vents 116 are formed at both sides of the air-conditioning case 110 in the width direction. Furthermore, the console vent 115 is formed between a pair of the rear floor vents 116 in the width direction. That is, the console vent 115 is arranged at the central part of the air-conditioning case 110 in the width direction.

Through the above structure, it is possible to form the rear seat floor vent 116 at the upper part of the console vent 115 and to minimize resistance of air heading toward the console vent 115. Finally, in the cooling mode, the air conditioner can reduce ventilation resistance of the air passageway between the rear seat cold air passageway P3 and the console vent 115 in order to increase the air volume of the rear seat air outlet and enhance rear seat cooling performance.

The rear seat mode door 158 is formed in a dome shape of which both sides in the width direction are closed in order to adjust the degree of opening of the console vent 115 and the degree of opening of the rear seat floor vent 116. The warm air of the warm air passageway P2 moves downwards through the lateral surface of the rear seat floor vent 116, and then, is discharged through a rear seat floor vent outlet 1165 of the lower end.

In other words, both sides of the rear seat mode door 158 in the width direction block the entrance of the rear seat floor vent 116 to shut off the air discharged to the rear seat floor vent 116, and the dome-shaped surface blocks the entrance of the console vent 115 to shut off the air discharged to the console vent 115. In the vent mode, the rear seat mode door 158 is rotated to the maximum in the counterclockwise direction to close the rear seat floor vent 116. The entire air flowing in the rear seat cold air passageway P3 is discharged to the interior of the vehicle through the console vent 115.

Figure 7:
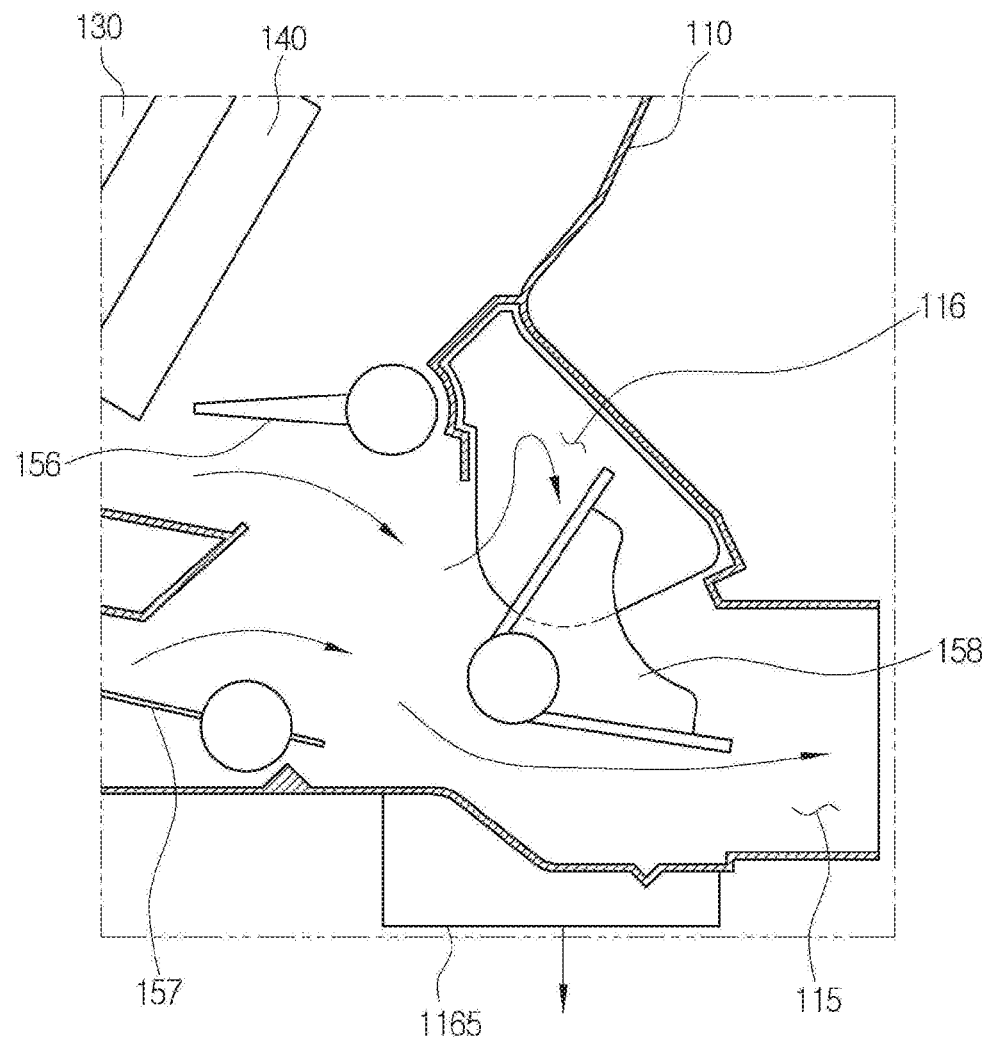
FIG. 7 is a view showing a location of the rear seat mode door in a bi-level mode according to the embodiment of the present invention.
Figure 8:
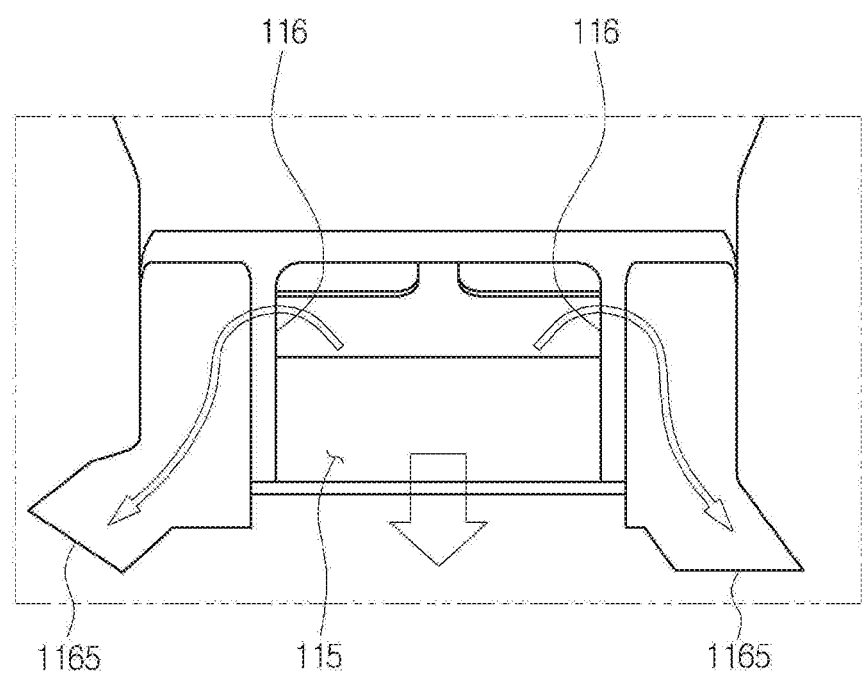
FIG. 8 is a front view of the air-conditioning case showing the air flow in the bi-level mode according to the embodiment of the present invention.

FIG. 7 is a view showing a location of the rear seat mode door in a bi-level mode according to the embodiment of the present invention, and FIG. 8 is a front view of the air-conditioning case showing the air flow in the bi-level mode according to the embodiment of the present invention.

Referring to FIGS. 7 and 8, in the bi-level mode, the rear seat mode door 158 is rotated to open all of the rear seat floor vent 116 and the console vent 115. Some of the air flowing in the warm air passageway P2 and the rear seat cold air passageway P3 is discharged to the interior of the vehicle through the rear seat floor vent 116 and the other of the air is discharged to the interior of the vehicle through the console vent 115.

In this instance, lots of warm air passing through the warm air passageway P2 is induced into the entrance of the rear seat floor vent 116 located above the entrance of the console vent 115, so that relatively cold air is discharged to the console vent 115 and relatively warm air is discharged to the rear seat floor vent 116. Therefore, the air conditioner for a vehicle can enhance passenger satisfaction with respect to air-conditioning performance.

Figure 9:
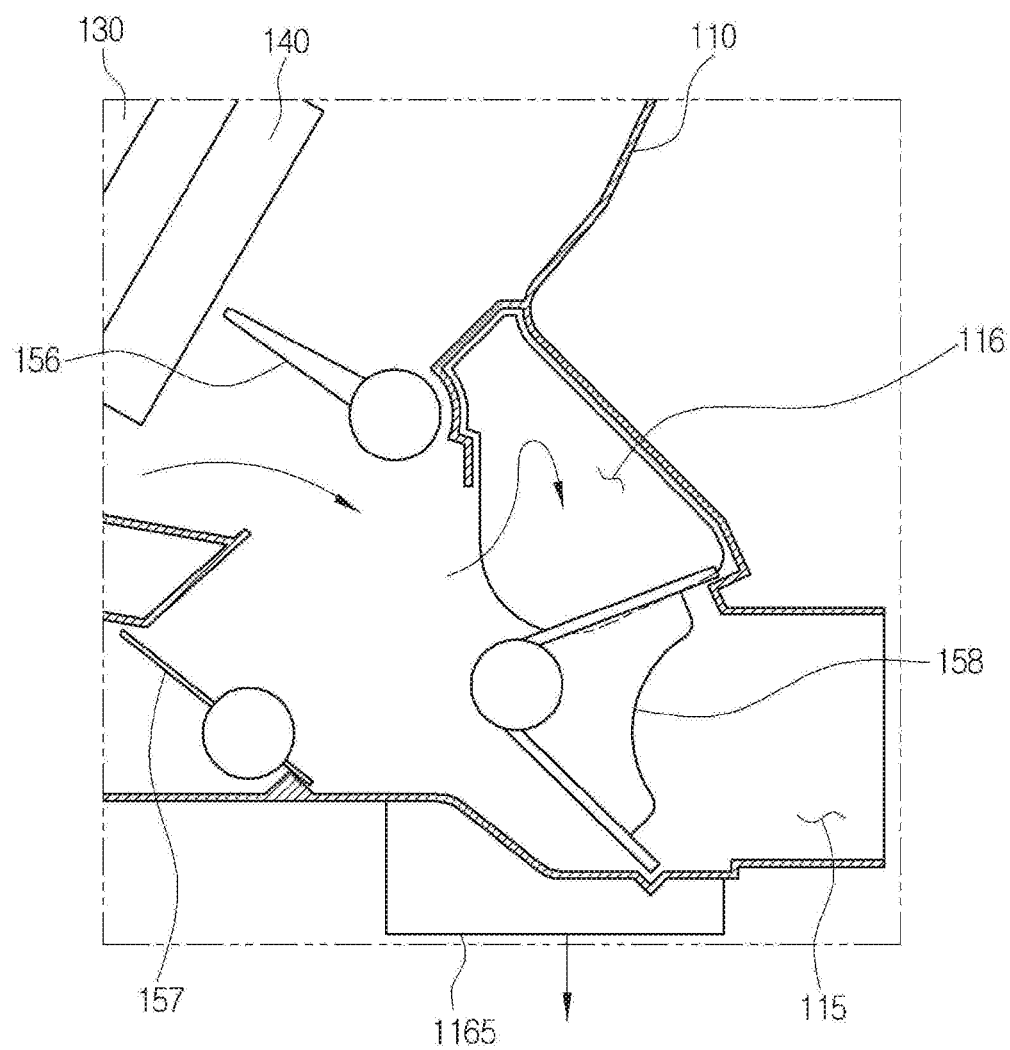
FIG. 9 is a view showing a location of the rear seat mode door in a floor mode according to the embodiment of the present invention.
Figure 10:
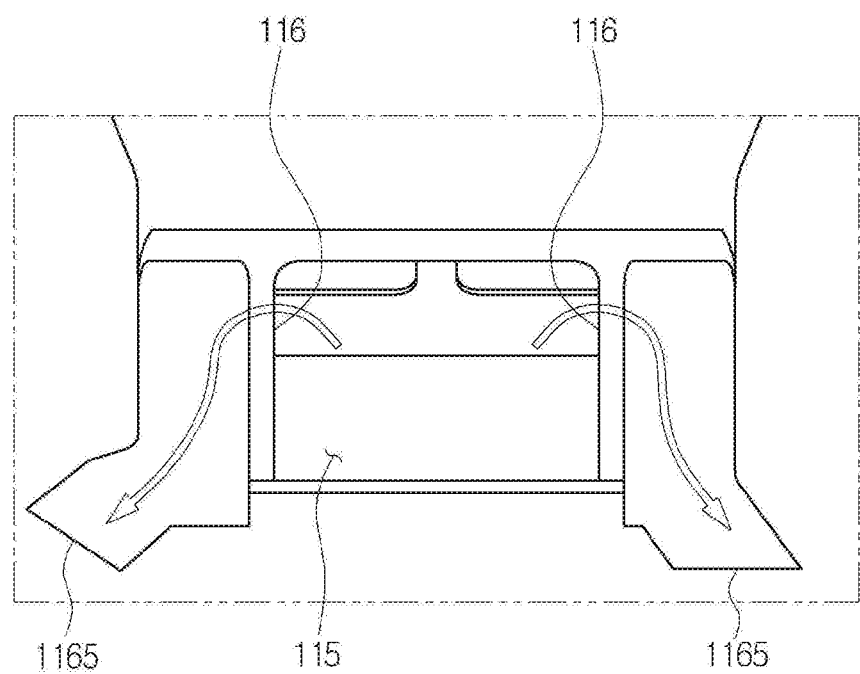
FIG. 10 is a front view of the air-conditioning case showing the air flow in the floor mode according to the embodiment of the present invention.

FIG. 9 is a view showing a location of the rear seat mode door in a floor mode according to the embodiment of the present invention, and FIG. 10 is a front view of the air-conditioning case showing the air flow in the floor mode according to the embodiment of the present invention.

Referring to FIGS. 9 and 10, in the floor mode, the rear seat mode door 158 is rotated to the maximum in the clockwise direction to close the console vent 115. The entire air flowing in the warm air passageway P2 is discharged to the interior of the vehicle through the rear seat floor vent 116.

Figure 11:
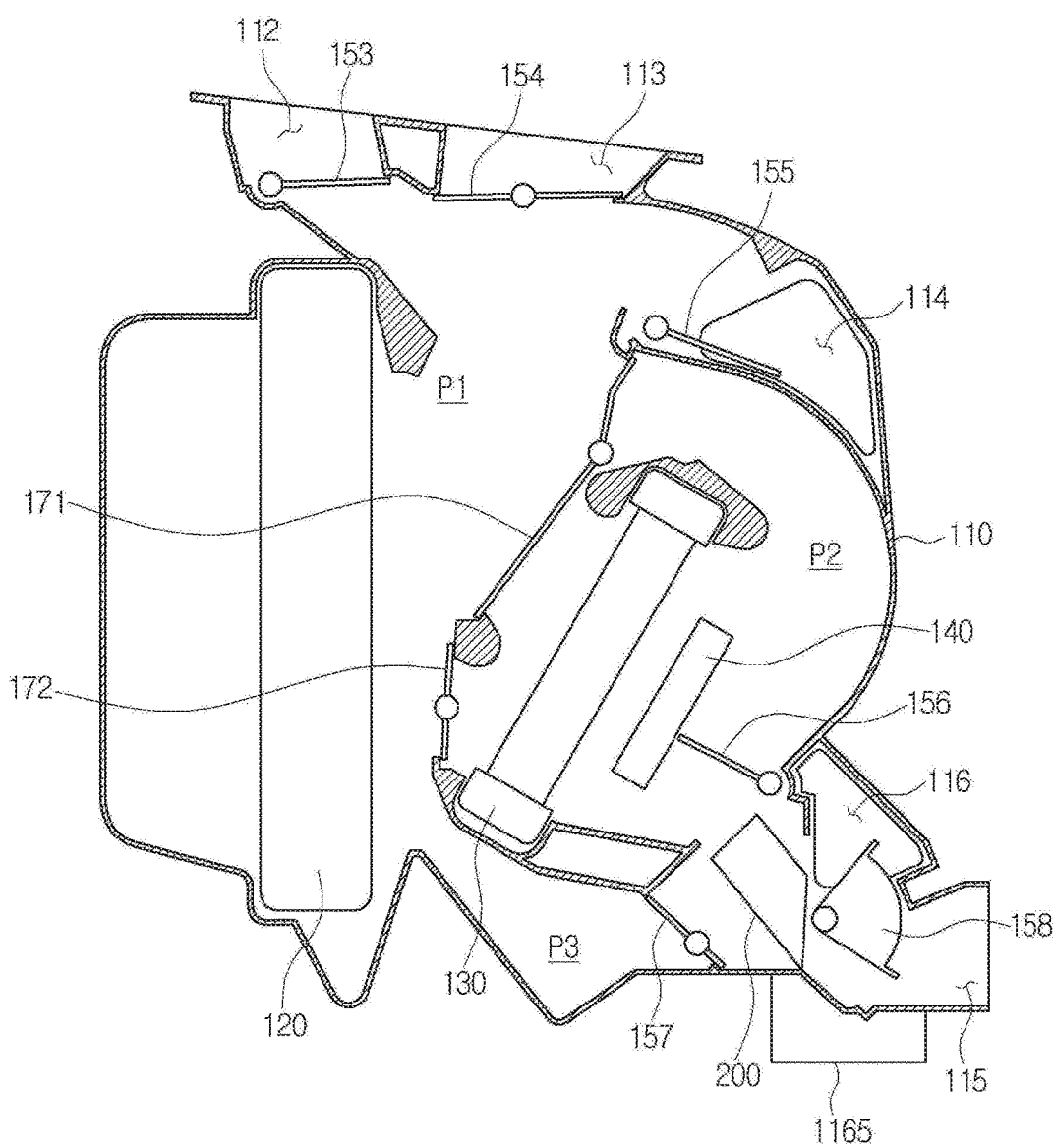
FIG. 11 is a sectional view showing an air conditioner for a vehicle according to a modification of FIG. 4.
Figure 12:
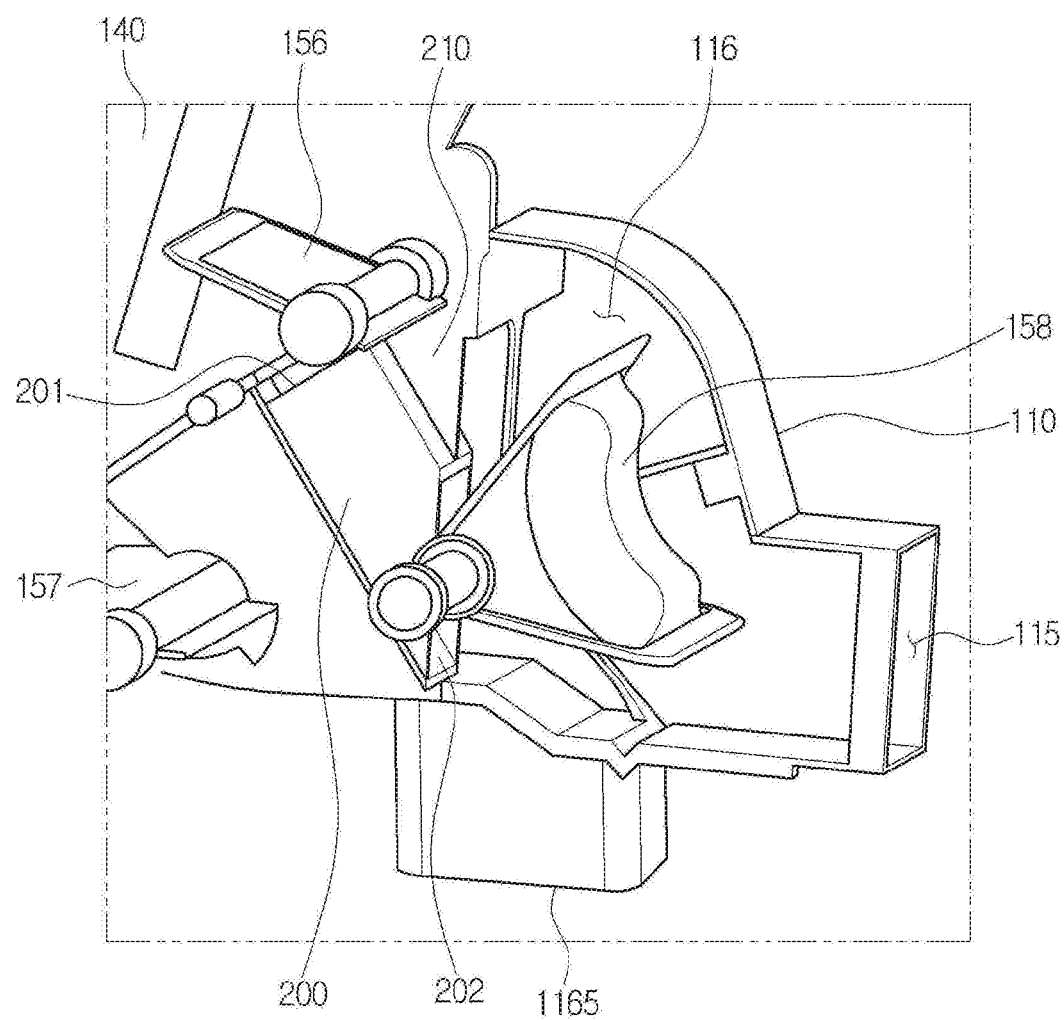
FIG. 12 is a perspective view, in partial section, of the air-conditioning case having a hot channel part according to the embodiment illustrated in FIG. 11.
Figure 13:
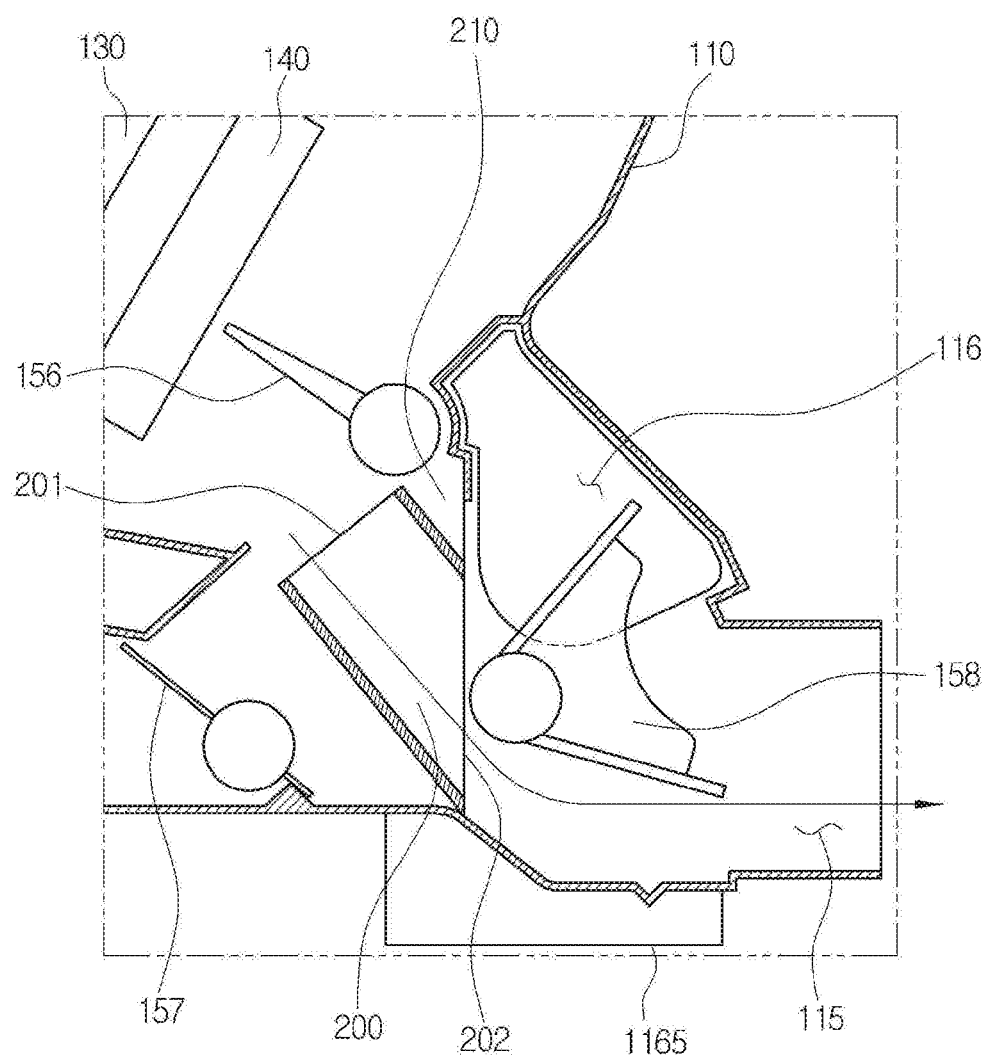
FIG. 13 is a sectional view of FIG. 12.

FIG. 11 is a sectional view showing an air conditioner for a vehicle according to a modification of FIG. 4, FIG. 12 is a perspective view, in partial section, of the air-conditioning case having a hot channel part according to the embodiment illustrated in FIG. 11, and FIG. 13 is a sectional view of FIG. 12.

Referring to FIGS. 11 to 13, the air conditioner for a vehicle according to the modification of the present invention includes a hot channel part 200, differently from the embodiment illustrated in FIG. 4. The hot channel part 200 is disposed at the downstream side of the heating heat exchanger, and is arranged at the downstream side of the electric heater 140. The hot channel part 200 guides the air passing the heater core 130 and the electric heater 140 to the console vent 115.

The hot channel part 200 having the above structure can guide some of the warm air of the warm air passageway P2 to the console vent 115. In the first embodiment, because the entrance of the rear seat floor vent 116 is formed above the entrance of the console vent 115, an amount of the warm air discharged to the console vent 115 may be drastically reduced. However, if some of the warm air is guided to the console vent 115 by the hot channel part 200, it can prevent reduction of the amount of warm air.

The hot channel part 200 connects the warm air passageway P2 with the entrance of the console vent 115. In detail, the hot channel part 200 is formed in an approximately rectangular tube shape of which both sides are opened. One side 201 of the hot channel part 200 is opened toward the warm air passageway P2, and the other side 202 is opened toward the console vent 115.

In more detail, the opening part of the other side 202 of the hot channel part 200 is formed below the entrance of the rear seat floor vent 116. Moreover, the opening part of the other side 202 of the hot channel part 200 faces the inner surface of the dome shape of the rear seat mode door 158. That is, the hot channel part 200 is formed between a pair of the rear seat floor vents 116.

The hot channel part having the above structure can guide the warm air of the warm air passageway P2 toward the console vent 115 more smoothly and enhance heating performance by reducing resistance of the warm air if it is necessary to send lots of warm air to the console vent 115 in the heating mode. Moreover, even in the bi-level mode, the hot channel part can prevent concentration of the warm air on the rear seat floor vent 116, and induce some of the warm air to the console vent 115 in order to be more effective in control of temperature.

Figure 14:
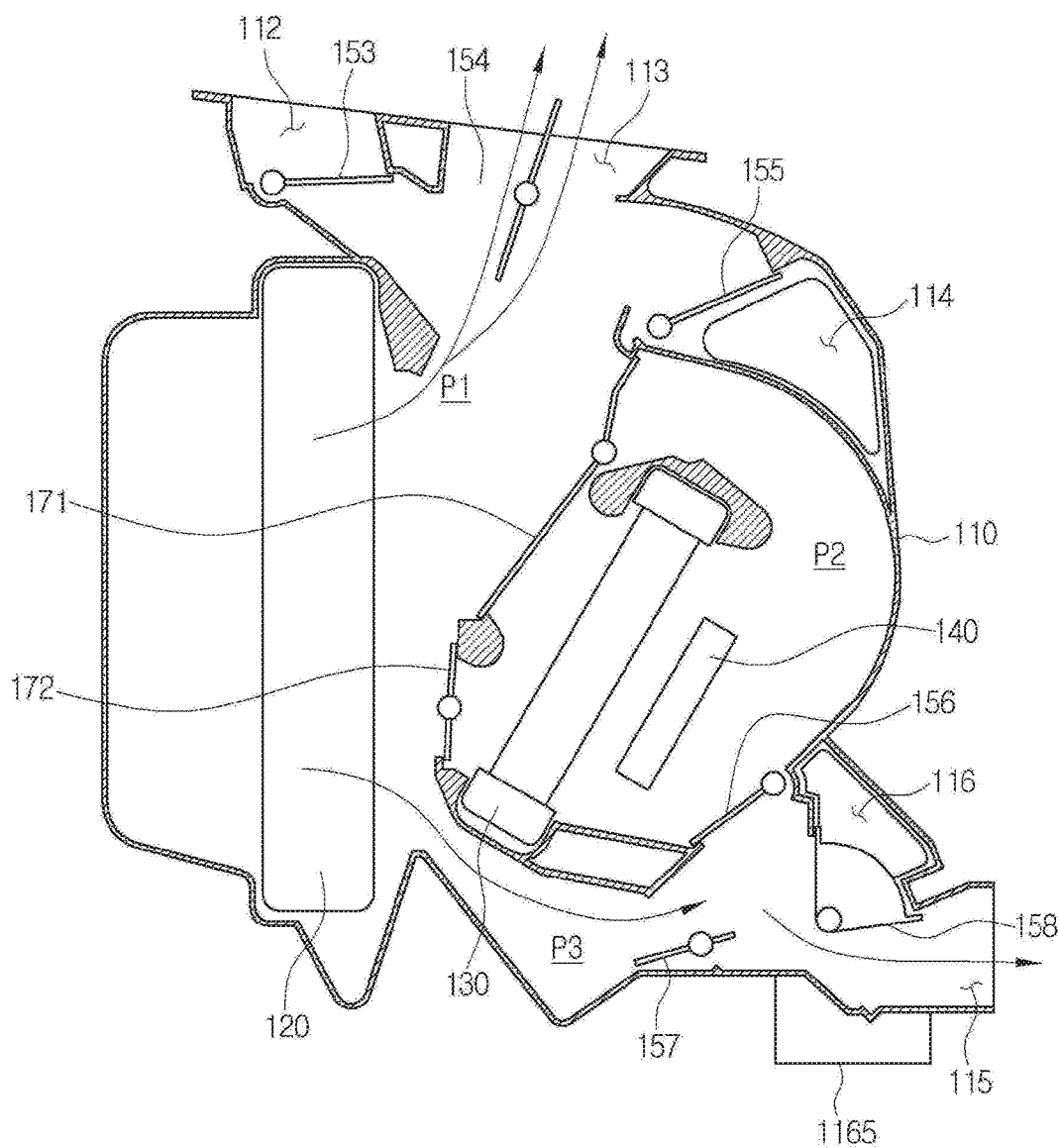
FIG. 14 is a view showing the vent mode of the air conditioner for a vehicle according to the embodiment of the present invention.

FIG. 14 is a view showing the vent mode of the air conditioner for a vehicle according to the embodiment of the present invention.

Referring to FIG. 14, in the vent mode, the front seat temperature door 171 and the first rear seat temperature door 172 close the warm air passageway P2. Some of the air passing through the evaporator 120 is discharged to the interior of the vehicle through the front seat vent 113, and the other of the air is discharged to the interior of the vehicle through the console vent 115. In this instance, the second rear seat temperature door 156 closes the warm air passageway P2, and the rear seat on-off door 157 opens the rear seat cold air passageway, and the rear seat mode door 158 closes the rear seat floor vent 116.

Figure 15:
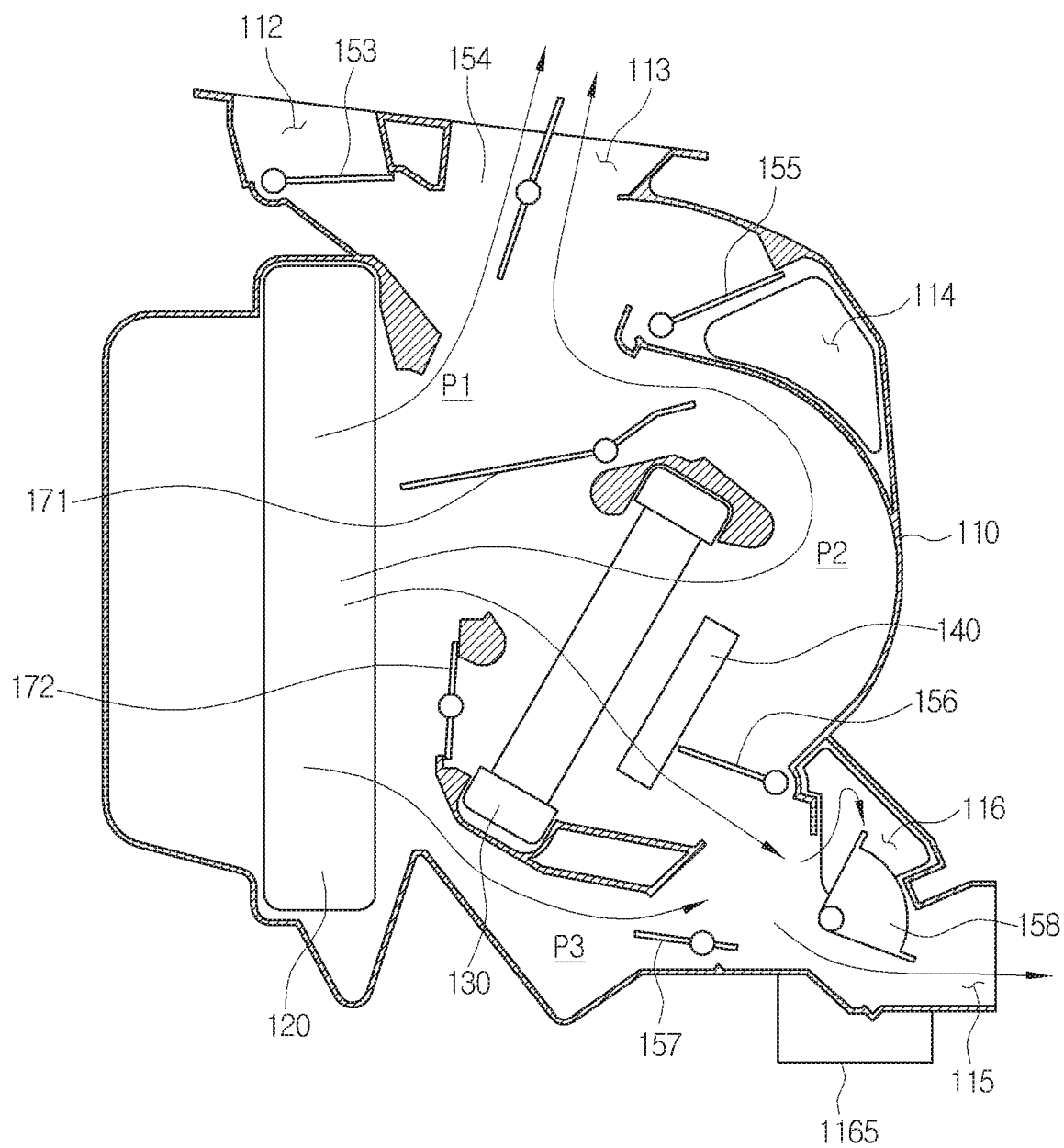
FIG. 15 is a view showing the bi-level mode of the air conditioner for a vehicle according to the embodiment of the present invention.

FIG. 15 is a view showing the bi-level mode of the air conditioner for a vehicle according to the embodiment of the present invention.

Referring to FIG. 15, in the bi-level mode, the front seat temperature door 171 and the first rear seat temperature door 172 open the warm air passageway P2 and the rear seat cold air passageway P3. Some of the air passing through the evaporator 120 passes the heater core 130 and the electric heater 140, and the other of the air flows into the front seat cold air passageway P1 and the rear seat cold air passageway P3. Some of the air is discharged to the interior of the vehicle through the front seat face vent 113, and the other of the air is discharged to the interior of the vehicle through the rear seat floor vent 116 and the console vent 115. In this instance, the second rear seat temperature door 156 opens the warm air passageway P2, the rear seat on-off door 157 opens the rear seat cold air passageway, and the rear seat mode door 158 opens the rear seat floor vent 116 and the console vent 115.

Figure 16:
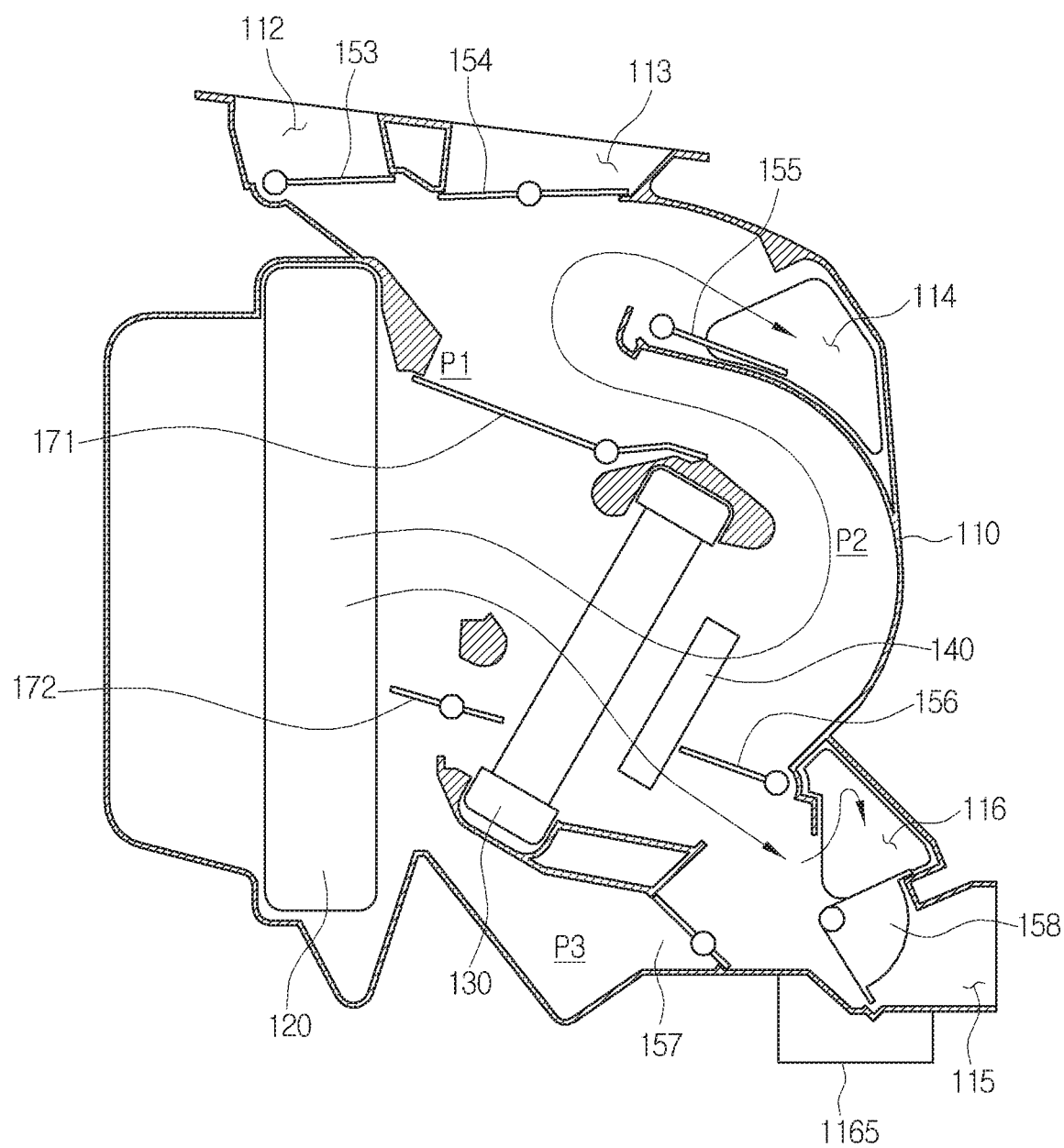
FIG. 16 is a view showing the floor mode of the air conditioner for a vehicle according to the embodiment of the present invention.

FIG. 16 is a view showing the floor mode of the air conditioner for a vehicle according to the embodiment of the present invention.

Referring to FIG. 16, in the floor mode, the front seat temperature door 171 and the first rear seat temperature door 172 close the front seat cold air passageway P1 and open the warm air passageway P2. The air passing through the evaporator 120 passes through the heater core 130 and the electric heater 140, and some of the air is discharged to the interior of the vehicle through the front seat floor vent 114, and the other of the air is discharged to the interior of the vehicle through the rear seat floor vent 116. In this instance, the second rear seat temperature door 156 opens the warm air passageway P2, the rear seat on-off door 157 closes the rear seat cold air passageway, and the rear seat mode door 158 closes the console vent 115.

Figure 17:
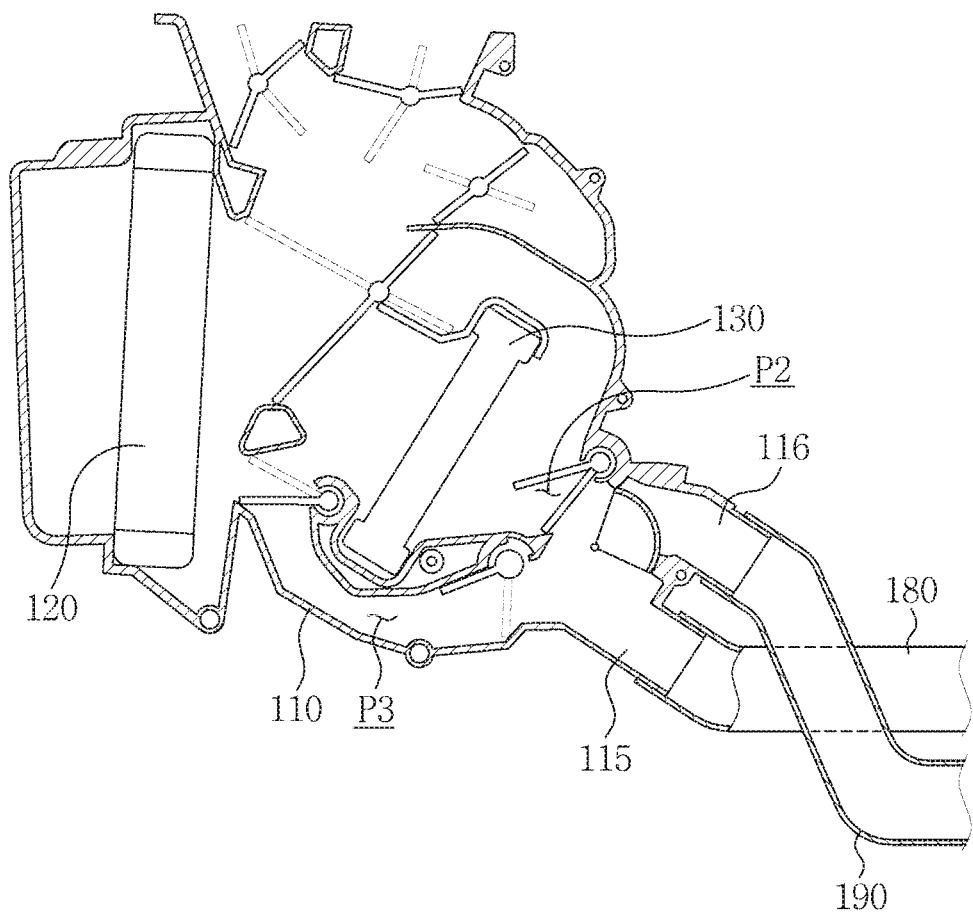
FIG. 17 is a sectional view of an air conditioner for a vehicle according to a second embodiment of the present invention.
Figure 18:
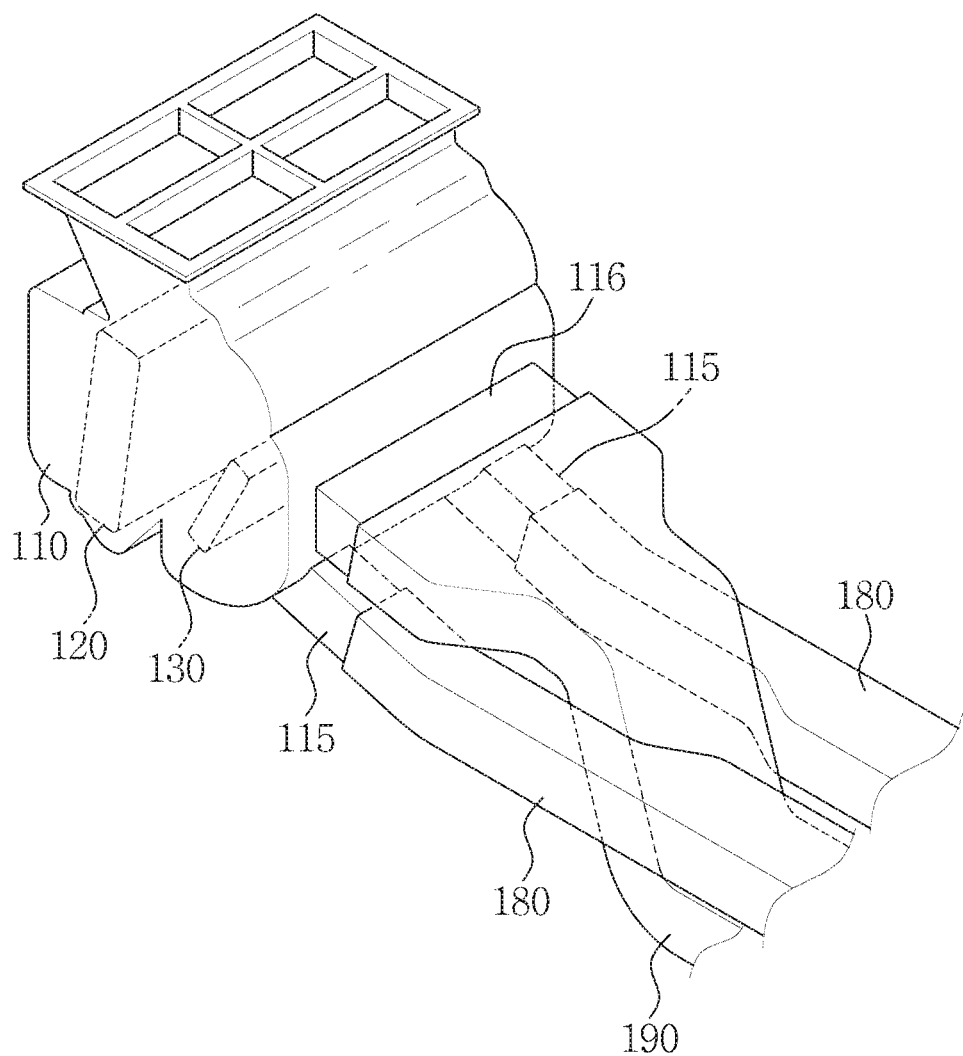
FIG. 18 is a perspective view of the air conditioner for a vehicle according to the second embodiment of the present invention.
Figure 19:
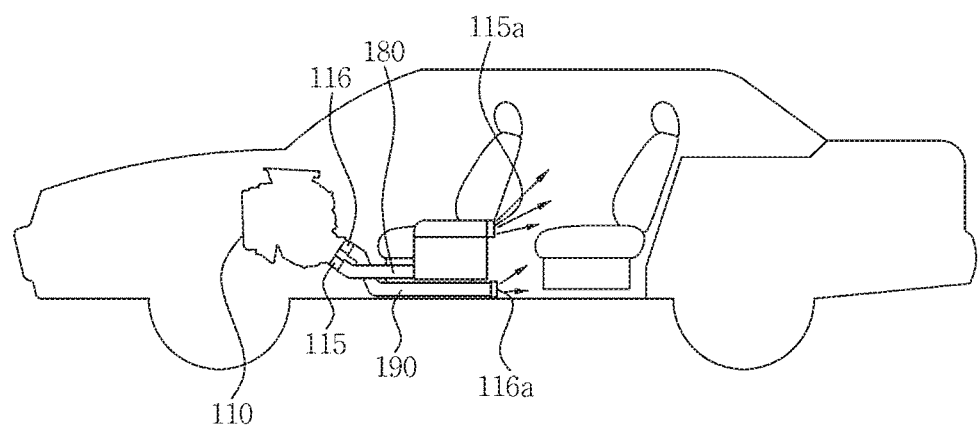
FIG. 19 is a perspective view showing an example of an operation of the air conditioner for a vehicle according to the second embodiment of the present invention.

FIG. 17 is a sectional view of an air conditioner for a vehicle according to a second embodiment of the present invention, FIG. 18 is a perspective view of the air conditioner for a vehicle according to the second embodiment of the present invention, and FIG. 19 is a perspective view showing an example of an operation of the air conditioner for a vehicle according to the second embodiment of the present invention.

Referring to FIGS. 17 to 19, the air conditioner for a vehicle according to the second embodiment of the present invention discharges cold air of the rear seat cold air passageway P3 near the evaporator 120 and warm air of the warm air passageway P2 near the heater core 130 toward the console duct 180 and the rear seat floor vent 190. The rear seat cold air passageway P3 near the evaporator 120 is formed in the bottom surface of the air-conditioning case 110 below the heater core 130, and the warm air passageway P2 near the heater core 130 is formed above the rear seat cold air passageway P3 in the direction of gravity.

The air conditioner for a vehicle includes the console vent 115 and the rear seat floor vent 116, and the console vent 115 and the rear seat floor vent 116 are respectively disposed to correspond to the rear seat cold air passageway P3 of the lower side and the warm air passageway P2 of the upper side. The console vent 115 corresponds to the rear seat cold air passageway P3 near the evaporator 120 formed at the lower part of the air-conditioning case 110, and the rear seat floor vent 116 corresponds to the warm air passageway P2 near the heater core 130 formed at the upper part of the rear seat cold air passageway P3.

Because the console vent 115 and the rear seat floor vent 116 respectively correspond to the rear seat cold air passageway P3 of the lower side and the warm air passageway P2 of the upper side, they mainly discharge the air flowing in the corresponding passageways. The console vent 115 discharges relatively more cold air of the rear seat cold air passageway P3 since corresponding to the rear seat cold air passageway P3 of the lower side, and the rear seat floor vent 116 discharges relatively more warm air of the warm air passageway P2 since corresponding to the warm air passageway P2 of the upper side. Therefore, the cold air discharged through the console vent 115 is mainly introduced into the console duct 180, and the warm air discharged through the rear seat floor vent 116 is mainly introduced into the rear seat floor duct 190.

The cold air discharged through the console vent 115 can be blown in the upward direction of the rear seat through the console duct 180, and the warm air discharged through the rear seat floor vent 116 can be blown in the downward direction of the rear seat through the rear seat floor duct 190. As a result, the cold air of the console vent 115 is supplied toward the face of the passenger who is sitting on the rear seat, and the warm air of the rear seat floor vent 116 is supplied toward the legs of the passenger. Finally, the air conditioner for a vehicle according to this embodiment remarkably enhances the comfort properties of the passenger who is sitting on the rear seat.

Because the console vent 115 corresponds to the rear seat cold air passageway P3 of the lower side and the rear seat floor vent 116 corresponds to the warm air passageway P2 of the upper side, the console vent 115 is arranged at the lower side and the rear seat floor vent 116 is arranged at the upper side. In this instance, because the console vent 115 of the lower side must discharge air in the upward direction of the rear seat and the rear seat floor vent 116 of the upper side must discharge air in the downward direction of the rear seat, the arrangement location of the console vent 115 and the rear seat floor vent 116 is disaccord with the air discharge direction of the rear seat.

Therefore, such disaccord between the arrangement location of the console vent 115 and the rear seat floor vent 116 and the air discharge direction of the rear seat must be corrected, and such correction is achieved through the console duct 180 and the rear seat floor duct 190. The console duct 180 is bent and extended in the upward direction of the rear seat after being connected with the console vent 115 of the lower side, and the extended console duct 180 guides the cold air discharged from the console vent 115 of the lower side in the upward direction of the rear seat.

Therefore, the disaccord between the location of the console vent 115 and the air discharge direction of the rear seat is corrected, and the air discharged through the console vent 115 is supplied in the upward direction of the rear seat regardless of the location of the console vent 115. The rear seat floor duct 190 is bent and extended in the downward direction of the rear seat after being connected with the rear seat floor vent 116 of the upper side, and the extended rear seat floor duct 190 guides the warm air discharged through the rear seat floor vent 116 of the upper side in the downward direction of the rear seat.

Therefore, the disaccord between the location of the rear seat floor vent 116 and the air discharge direction of the rear seat is corrected, and the air discharged through the rear seat floor vent 116 is supplied in the downward direction of the rear seat regardless of the location of the rear seat floor vent 116. Finally, through the structure of the console duct 180 and the rear seat floor duct 190, the disaccord between the arrangement location of the console vent 115 and the rear seat floor vent 116 and the air discharge direction of the rear seat is corrected.

Moreover, even though the console vent 115 is arranged below the direction of gravity and the rear seat floor vent 116 is arranged above in the direction of gravity, a final outlet 115a of the console vent 115 is arranged above the direction of gravity and a final outlet 116a of the rear seat floor vent 116 is arranged below the direction of gravity. Therefore, the disaccord between the arrangement location of the console vent 115 and the rear seat floor vent 116 and the air discharge direction of the rear seat is completely corrected.

In the meantime, a pair of the console vents 115 are formed side by side in the width direction of the air-conditioning case 10 to be spaced apart from each other, and the single rear seat floor vent 116 is formed in the width direction of the air-conditioning case 10. Moreover, a pair of the console ducts 180 are formed corresponding to the console ducts 115, and the single rear seat floor vent 116 is formed corresponding to the rear seat floor vent 116.

In this instance, the rear seat floor duct 190 is bent and extended in the downward direction of the rear seat from the rear seat floor vent 116, namely, is bent and extended between a pair of the console ducts 180. Therefore, because the arrangement structure of the console vents 115 and the rear seat floor vent 116 with respect to the warm air passageway P2 and the rear seat cold air passageway P3 is improved, cold air can be discharged to the console vents 115 and warm air can be discharged to the rear seat floor vent 116.

Furthermore, because cold air can be discharged to the console vents 115 and warm air can be discharged to the rear seat floor vent 116, cold air is transferred to the console ducts 180 and warm air is transferred to the rear seat floor duct 190. Additionally, because cold air is transferred to the console ducts 180 and warm air is transferred to the rear seat floor duct 190, cold air can be blown above the rear seat and warm air can be blown below the rear seat. In addition, because cold air can be blown above the rear seat and warm air can be blown below the rear seat, cold air is blown toward the passenger's face and warm air is blown toward the passenger's legs.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. An air conditioner for a vehicle, which has a rear seat outlet, the air conditioner comprising an air-conditioning case having an air passageway formed therein and a plurality of air outlets, and a cooling heat exchanger and a heating heat exchanger disposed in the air passageway of the air-conditioning case to exchange heat with air passing through the air passageway,
    wherein the air outlets include a console vent and a rear seat floor vent, and
    wherein an entrance of the rear seat floor vent is formed above an entrance of the console vent.

2. The air conditioner according to claim 1, wherein a discharge path of the console vent is formed below a warm air passageway to be connected with a cold air passageway, and
    wherein a discharge path of the rear seat floor vent is formed above the cold air passageway to be connected with the warm air passageway.

3. The air conditioner according to claim 1, wherein the rear seat floor vents are formed at both sides of the air-conditioning case in the width direction, and the console vent is formed between a pair of the rear floor vents in the width direction.

4. The air conditioner according to claim 3, wherein warm air of the warm air passageway moves downwards through the lateral surface of the rear seat floor vent path, and then, is discharged through a rear seat floor vent outlet.

5. The air conditioner according to claim 3, further comprising:
    a rear seat mode door for adjusting the degree of opening of the console vent and the degree of opening of the rear seat floor vent,
    wherein the rear seat mode door is formed in a dome shape of which both sides are closed in a width direction.

6. The air conditioner according to claim 5, wherein both sides of the rear seat mode door in the width direction block the entrance of the rear seat floor vent to shut off the air discharged to the rear seat floor vent, and the dome-shaped surface blocks the entrance of the console vent to shut off the air discharged to the console vent.

7. The air conditioner according to claim 1, wherein the air passageway of the air-conditioning case comprises: a warm air passageway formed to make the air passing the cooling heat exchanger pass the heating heat exchanger; a front seat cold air passageway formed to make the air passing the cooling heat exchanger bypass the heating heat exchanger so as to be discharged to the front seat of the vehicle; and a rear seat cold air passageway formed to make the air passing the cooling heat exchanger bypass the heating heat exchanger so as to be discharged to the rear seat of the vehicle, and
    wherein the front seat cold air passageway, the warm air passageway, and the rear seat cold air passageway have rear seat outlets, which are formed vertically in order.

8. The air conditioner according to claim 7, further comprising:
    a rear seat outlet including a front seat temperature door for adjusting the degree of opening between the front seat cold air passageway and a part of the warm air passageway, a first rear seat temperature door arranged between the cooling heat exchanger and the heating heat exchanger to adjust the degree of opening of another part of the warm air passageway, and a second rear seat temperature door arranged at the downstream side of the heating heat exchanger to adjust the degree of opening between the warm air passageway and the rear seat cold air passageway.

9. The air conditioner according to claim 1, wherein the rear seat outlet further includes a hot channel part for guiding the air passing the heating heat exchanger to the console vent at the downstream side of the heating heat exchanger.

10. The air conditioner according to claim 9, wherein the hot channel part connects the warm air passageway with the entrance of the console vent.

11. The air conditioner according to claim 9, wherein the hot channel part is formed in a tube shape of which both sides are opened, and one side is opened toward the warm air passageway and the other side is opened toward the console vent.

12. The air conditioner according to claim 11, wherein the opening part of the other side of the hot channel part is formed below the entrance of the rear seat floor vent.

13. The air conditioner according to claim 11, further comprising:
    a rear seat mode door for adjusting the degree of opening of the console vent and the degree of opening of the rear seat floor vent,
    wherein the rear seat mode door is formed in a dome shape of which both sides are closed in the width direction, and
    wherein the opening part of the other side of the hot channel part faces the dome-shaped inner surface of the rear seat mode door.

14. The air conditioner according to claim 9, wherein the rear seat floor vents are formed at both sides of the air-conditioning case in the width direction, and
    wherein the hot channel part is formed between a pair of the rear seat floor vents in the width direction.

15. An air conditioner for a vehicle, comprising: a rear seat cold air passageway for transferring cold air passing through a cooling heat exchanger, a warm air passageway for transferring warm air passing through a heating heat exchanger, and a console vent and a rear seat floor vent for discharging the cold air of the rear seat cold air passageway and the warm air of the warm air passageway to the rear seat of the interior of the vehicle, wherein the console vent is formed to correspond to the rear seat cold air passageway near the cooling heat exchanger, and the rear seat floor vent is formed to correspond to the warm air passageway near the heating heat exchanger: a console, duct for transferring the cold air discharged from the console, vent in the upward direction from a passenger who is sitting on the rear seat; and a rear seat floor duct for transferring the warm air discharged from the rear seat floor vent in the downward direction from the passenger who is sitting on the rear seat, wherein the console duct is bent and e, tended in the upward direction of the rear seat from the console vent of the lower side to transfer the cold air discharged from the console, vent of the lower side toward the face of the passenger who is sitting on the rear seat, and wherein the rear seat floor duct is bent and extended in the downward direction of the rear seat from the rear seat floor vent of the upper side to transfer the warm air discharged from the rear seat floor vent of the upper side toward the legs of the passenger who is sitting on the rear seat.

16. The air conditioner according to claim 15, wherein the rear seat cold air passageway is formed at a lower part of the air-conditioning case and below the heating heat exchanger and the warm air passageway is formed above the rear seat cold air passageway, and wherein the console vent and the rear seat floor vent are respectively formed at the lower part and the upper part of the air-conditioning case to correspond to the rear seat cold air passageway of the lower side and the warm air passageway of the upper side.

17. The air conditioner according to claim 15, wherein a pair of the console vents are formed side by side in the width direction of the air-conditioning case to be spaced apart from each other, and the single rear seat floor vent is formed in the width direction of the air-conditioning case, and wherein a pair of the console ducts are formed corresponding to the console ducts, and the single rear seat floor vent is formed corresponding to the rear seat floor vent.

18. The air conditioner according to claim 17, wherein the rear seat floor duct is bent and extended in the downward direction of the rear seat from the rear seat floor vent, between a pair of the console ducts.

* * * * *